United States Patent Office 2,765,407
Patented Oct. 2, 1956

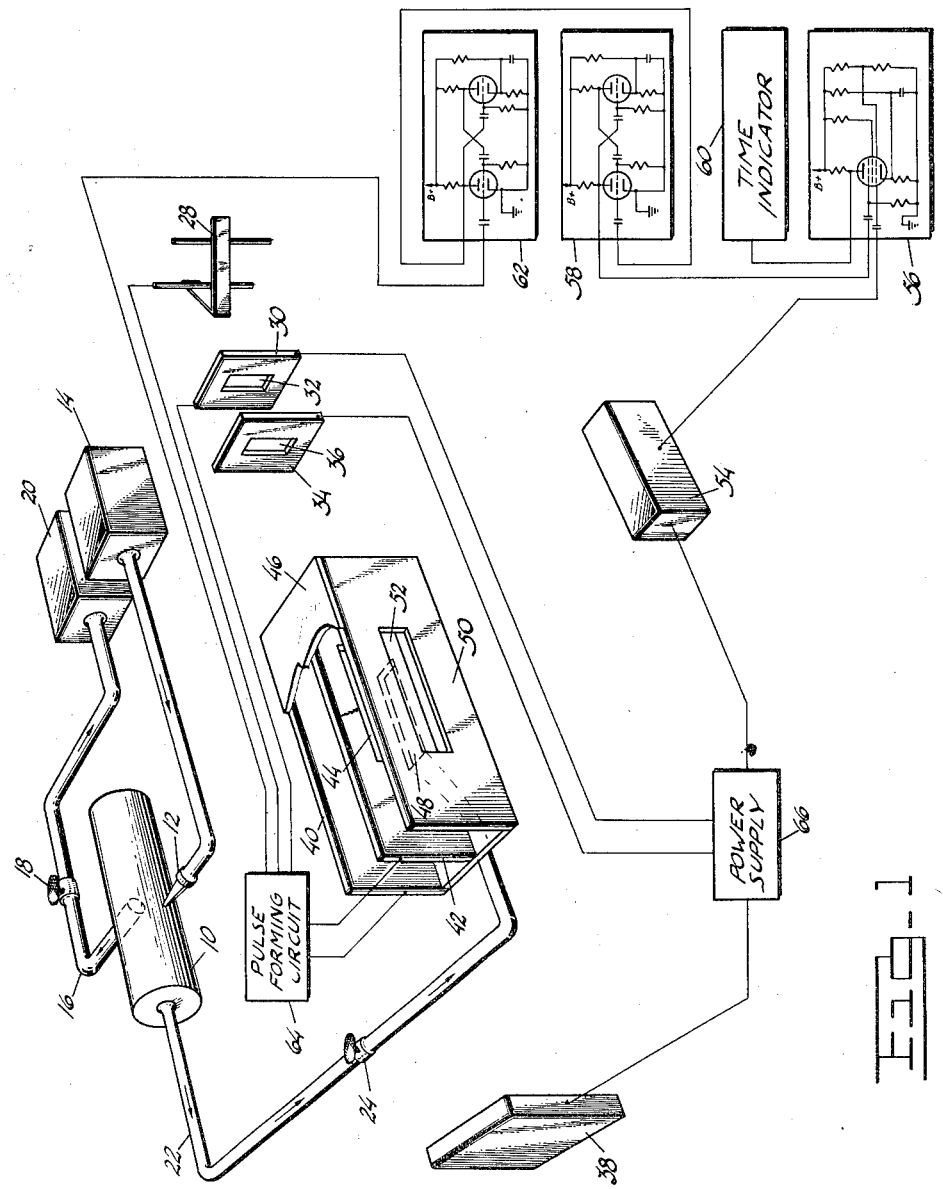

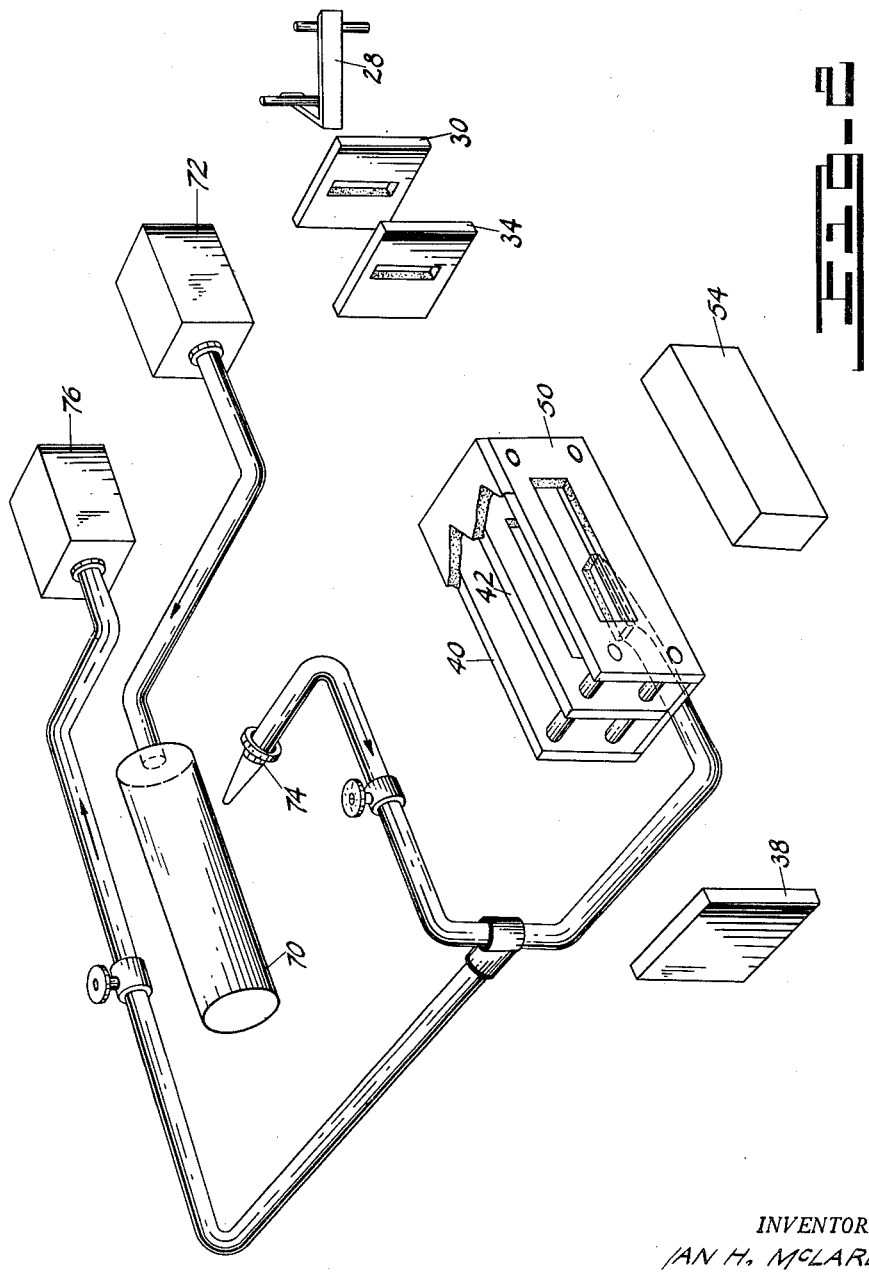

2,765,407

APPARATUS FOR AND METHOD OF DETECTING LEAKS

Ian H. McLaren, Dearborn, and William C. Wiley, Detroit, Mich., assignors to Bendix Aviation Corporation, Detroit, Mich., a corporation of Delaware Application May 2, 1952, Serial No. 285,826

3 Claims. (Cl. 250—41.9)

This invention relates to apparatus for, and methods of, detecting leaks in a container and more particularly to apparatus for, and methods of, detecting leaks by utilizing pulses of ions formed from molecules of gas escaping through the leaks.

Several types of detectors are now in use for locating leaks of relatively small magnitude. One detector locates leaks by introducing a halogen compound into the equipment to be tested through leaks in the equipment and by reacting the halogen compound with members peculiarly sensitive to halogens. Another detector utilizes a mass spectrometer which ionizes the molecules of gas leaking through the equipment to be tested and which directs the ions in a continuous stream to a collector so as to obtain an indication of the leak. Only the ions of a particular mass pass to the collector because of the application of a magnetic field to deflect the ions of that mass through a slit in front of the collector.

The detectors now in use are not entirely satisfactory for several reasons. They are not always able to detect extremely small leaks because they continuously operate on the molecules of gas passing through the leak and do not build up the concentration of the gas molecules before a measurement is made. In addition, the detectors are not always as stable as might sometimes be desired because of their normal operation on a direct current basis to produce a continuous signal. Furthermore, by producing direct current outputs, the detectors are not able to operate entirely satisfactorily with auxiliary devices for controlling the operation of the equipment having the leak.

This invention provides apparatus for, and methods of, providing an extremely sensitive indication of a leak. The apparatus introduces the gas molecules passing through the leak to an electron stream which ionizes the molecules and retains them until a considerable number of ions has been collected. The apparatus then withdraws the ions in a pulse from the stream and accelerates the pulse through a predetermined distance. By building up the ion concentration and then accelerating the ions in a pulse, a relatively strong and clear output indication is obtained. The apparatus also accentuates the sharpness of the indication by focusing the ions as they are accelerated. Since the output is in pulse form, indicating and control circuits responsive to alternating signals can be utilized to obtain an increased sensitivity in operation and simplicity in construction over circuits now in use in leak detectors.

An object of this invention is to provide apparatus for automatically detecting and locating leaks.

Another object is to provide apparatus for detecting leaks so small that they cannot be found by equipment now in use.

A further object is to provide a leak detector for producing an alternating output so as to obtain an increased stability and sensitivity in the operation of the detector.

Still another object is to provide a leak detector for ionizing the molecules of gas escaping through a leak and for forming the ions into pulses for detection at a relatively great sensitivity.

A still further object is to provide a method of detecting leaks by utilizing pulses of ions to provide an indication.

Other objects and advantages will be apparent from a detailed description of the invention and from the appended drawings and claims.

In the drawings:

Figure 1 is a somewhat schematic diagram, partly in block form and partly in perspective, illustrating a detector for locating leaks in a vessel having a relatively low pressure; and Figure 2 is a somewhat schematic view illustrating a modification of the leak detector shown in Figure 1 for measuring leaks in vessels operating under a relatively high pressure.

In the embodiment of the invention shown in Figure 1, a vessel 10 closed to the atmosphere is evacuated to operate under a relatively low pressure. A probe 12 is adapted to move along the vessel 10 for the injection of gas into the vessel in case of any leak. The probe 12 is connected to a container 14 which holds a neutral gas, such as helium, under pressure for introduction to the vessel in case of any leak.

An auxiliary conduit 16 is connected to the vessel 10 and is provided with a valve 18 which controls the operation of an auxiliary pumping system 20 to maintain the vessel 10 at a low pressure. A main conduit 22 also extends from the vessel 10 and has a valve 24 for controlling the amount of gas passing through the conduit into a mass spectrometer hereinafter to be disclosed in detail.

The mass spectrometer includes a wedge-shaped filament 28 made from a suitable material, such as tungsten, which emits a relatively large number of electrons when heated. A control electrode 30 is disposed at a relatively close distance to the filament 28 and is provided with a vertical slot 32, the median position of which is substantially level with the filament 28. An accelerating electrode 34 having a slot 36 corresponding substantially in shape and position to the slot 32 is aligned with the electrode 30 at a relatively short distance from the electrode. A collector 38 is also aligned with the electrode 30 and 34 at a relatively great distance from the electrodes.

A backing plate 40 is disposed between the electrode 34 and the collector 38 slightly to the rear of an imaginary line extending from the tip of the filament 28 through the slots 32 and 36. An electrode 42 having a horizontal slot 44 is provided slightly in front of the imaginary line disclosed above and substantially in alignment with the backing plate 40. The plate 40 and grid 42 are connected by top and bottom slats 46, the bottom slat having a slot 48 which communicates with the main conduit 22.

An electrode 50 is substantially aligned with the electrode 42 at a relatively short distance in front of the electrode 42 and is provided with a slot 52 corresponding in shape and position to the slot 44. A collector 54 is substantially in alignment with the electrodes 42 and 50 at a relatively great distance from the electrodes. The collector is connected to the control grid of the pentode in a gate circuit 56 having its suppressor grid connected to the plate of the left tube in a monostable multivibrator 58 and its plate connected to the input terminal of an indicator 60, such as an oscilloscope.

The construction and operation of gate circuits similar to the gate circuit 56 are fully disclosed on pages 364 to 388, inclusive, of volume 19 entitled "Waveforms" of the Radiation Laboratory Series published by the Massachusetts Institute of Technology. The construction and operation of monostable multivibrators similar to the multivibrator 58 are fully disclosed on pages 166 to 171, inclusive, of volume 19 of the M. I. T. series.

A connection is made from the grid of the left tube in the multivibrator 58 to the plate of the left tube in a monostable multivibrator 62, the grid of which receives negative pulses of voltage from a pulse forming circuit 64. As will be disclosed in detail hereinafter, negative pulses from the circuit 64 are also introduced to the filament 28 and the control grid 30, and positive pulses of voltage are applied to the backing plate 40 and the grid 42.

Pulse forming circuits corresponding to the circuit 64 may be either purchased or built. For example, Model 902 of the double pulse generator manufactured by the Berkeley Scientific Company of Richmond, California, may be used to produce first pulses for imposition on the filament 28 and the electrode 30 and second pulses for imposition on the backing plate 40 and the electrode 42. This model generator is fully disclosed in a publication entitled "Instruction Manual Berkeley Double Pulse Generator Model 902" issued by the Berkeley Scientific Company in August 1950.

The electrode 30 normally has a positive potential applied to it from a suitable power supply 66. The collectors 38 and 54 also have slightly positive potentials applied to them, the collector 38 to attract the electrons flowing from the filament 28 and the collector 54 to attract the electrons secondarily emitted from it by the impingement of ions. The filament 28, the electrode 34, the backing plate 40 and the electrodes 42 and 50 are normally at approximately ground potential.

In the steady state condition, electrons emitted from the filament 28 are accelerated only through the region between the filament 28 and the electrode 30 since the voltage on the filament is lower than the voltage on the electrode 30 and the voltage on the electrode 34 is lower than the voltage on the electrode 30. This acceleration is not sufficiently great to move the ions through the region between the electrodes 30 and 34 into the compartment formed by the backing plate 40 and the electrode 42. Therefore, substantially no molecules of gas introduced to the region between the plate 40 and the electrode 42 are ionized.

During the operation of the detector, negative pulses of voltage are produced at periodic intervals by the circuit 64 and are applied to the filament 28 and the electrode 30. These pulses cause the voltage on the electrode 30 to drop below the voltage on the electrode 34 so that the electrons flowing past the electrode 30 are given an added acceleration between the electrodes 30 and 34. This added acceleration causes the electrons to flow through the region between the backing plate 40 and the electrode 42 with a sufficient energy to ionize molecules of gas that they may strike in the region.

Molecules of gas cannot flow into the region between the plate 40 and the electrode 42 when the vessel 10 does not have a leak in it. However, if even a slight leak exists in the vessel, molecules of gas flow through the probe 12 into the spectrometer through a path including the container 14, the probe 12, the leak in the vessel 10, and the main conduit 22.

Some of the gas molecules introduced into the spectrometer are ionized by the electron stream and these ions are retained within the stream because of their opposite charge relative to that of the stream. Since the stream has a relatively great charge, a relatively large number of ions can be retained within the stream before saturation takes place. The ions are retained in a space having a relatively narrow width because of the collimating action which is provided on the electron stream by the slots 32 and 36 and which may be further provided by a suitable magnetic field (not shown). When a sufficient number of ions have been produced for retention within the electron stream, the ions are withdrawn in a bunch as a result of positive pulses of voltage applied to the backing plate 40 and the electrode 42. Utilization of an electron stream for retention of ions until they are withdrawn in pulse form is fully disclosed in co-pending application Serial No. 221,554, filed by us on April 18, 1951, now Patent No. 2,732,500.

The pulses of voltage on the backing plate 40 are moderate in magnitude relative to the pulses of voltage on the electrode 42, but the pulses of voltage on the electrode 42 are large in magnitude relative to ground potential on the electrode 50. For example, pulses of +200 volts may be applied to the plate 40 and pulses of +150 volts to the electrode 42 when the electrode 42 is separated from the plate 40 and the electrode 50 by approximately 2 millimeters and the collector 54 is separated from the electrode 50 by approximately 10 centimeters.

Because of the voltage pulses on the plate 40 and the electrode 42, the ions are moderately accelerated through the region between the plate 40 and the electrode 42 and considerably accelerated through the region between the electrodes 42 and 50. This two-stage acceleration minimizes the errors resulting from any differences in the positioning of individual ions along the width of the electron stream and in the random motion of the ions before the ions are withdrawn from the stream. The random motion of the ions is produced by their thermal and other energy, which causes some ions to be travelling towards the electrode 42 and other ions to be travelling away from the electrode just before the ions are withdrawn from the electron stream. By minimizing any errors resulting from differences in positioning and random motion of individual ions, the ion beam is focussed as it travels towards the collector 54. The use of a multiple number of electrodes to produce a focussing of the ion beam is fully disclosed in co-pending application Serial No. 249,318, filed October 2, 1951, by William C. Wiley.

Since the ions of different mass have equal forces applied to them by the voltage pulses on the plate 40 and the electrode 42, they are provided with accelerations inversely proportional to their masses. This causes the ions of relatively light mass to attain a greater velocity than the ions of relatively heavy mass and to reach the collector 54 before the ions of heavy mass. Because of the differences in speed, the masses of the different ions impinging on the collector 54 can be determined from the relative times at which the ions reach the collector. The ions impinging on the collector produce positive signals which are introduced to the grid of the pentode in the gate circuit 56.

As previously disclosed, molecules of a predetermined gas, such as helium, are introduced from the container 14 to the spectrometer through a leak in the vessel 10. Since the ions produced from molecules of the predetermined gas are retained within the stream, a signal is produced at the collector 54 at a predetermined time after the ions are withdrawn from the stream. This time corresponds to that required for molecules of the predetermined gas to travel from the electron stream to the collector 54.

The voltage pulses from the circuit 64 which cause the ions to be withdrawn from the electron stream also trigger the normally conductive left tube in the multivibrator 62 and cause the tube to become cut off. The multivibrator tube remains cut off for a period of time corresponding substantially to the time required for the ions formed from the predetermined gas to travel from the electron stream to the collector 54. Just before the ions reach the collector 54, the left tube in the multivibrator 62 starts to conduct again and produces on its plate a negative pulse of voltage which is introduced to the normally conductive left tube in the multivibrator 58. This negative voltage causes the normally conductive left tube in the multivibrator 58 to be cut off and a positive pulse to be produced on its plate. The positive pulse on the plate of the left tube in the multivibrator 58 continues until shortly after the time that the ion pulse is expected at the collector 54.

Since the positive pulse on the plate of the left tube in the multivibrator 58 corresponds in time to the signal produced by the ions impinging on the collector 54, a signal passes through the gate circuit 56 for introduction to the indicator 60. This signal causes the indicator 60 to provide an aural or visible demonstration that a leak exists in the vessel 10. The indicator 60 not only demonstrates the existence of a leak but also actually locates the position of the leak if the probe 12 is gradually moved along the vessel 10. This results from the fact that an output signal will be produced for operation of the indicator 60 only when the probe is adjacent the leak.

The embodiment shown in Figure 2 utilizes the same spectrometer as the system shown in Figure 1 to detect leaks in a vessel 70 operating under considerable pressure. Gas is pumped into the vessel from a container 72 similar to the container 14, and a probe 74 is provided for movement along the vessel 10 to trap gas passing from the container through the vessel as a result of a leak. The gas passing into the probe 74 is introduced into a mass spectrometer similar to that disclosed above to provide an indication of the leak. An auxiliary pumping system 76 is provided to maintain the pressure of the gas passing into the mass spectrometer within desirable limits.

The apparatus disclosed above has several important advantages. Since it collects a relatively large number of ions in a negative potential well before the ions are withdrawn in a bunch, it is able to provide stronger measurements than can be obtained from leak detectors now in use. The relatively large output pulse produced by the ion bunch as it impinges on the collector 54 is in sharp contrast to the signal of substantially zero amplitude produced shortly before and after the pulse. In this way, the detector is able to measure and locate smaller leaks than equipments now in use.

Since output pulses rather than continuous signals are produced by the spectrometer, circuits producing an alternating output are adapted to be used in conjunction with the spectrometer. Such alternating circuits are more simple, stable and sensitive than the circuits which are used with other detectors to produce a direct output. For example, the multivibrators 58 and 62 and the gate circuit 56 operate to pass a signal only when an ion pulse is produced at a predetermined and optimum instant. Only when a pulse passes through the gate circuit 56 is the indicator 60 operated.

It should be realized that other spectrometers utilizing pulse techniques may be substituted for the spectrometer disclosed above. For example, a spectrometer similar to that disclosed in co-pending application Serial No. 251,352 filed by William H. Wells and William C. Wiley on October 15, 1951, may also be utilized. Furthermore, the ions may be detected after passing through a predetermined distance rather than being actually collected. Other output circuits than those disclosed above may also be utilized to provide a gate for operating an indicator only when an ion pulse is detected at an optimum instant after it is initially accelerated.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A detector for locating leaks in a vessel, including, a probe, means for providing for the passage of molecules of a gas between the vessel and the probe upon the occurrence of a leak in the vessel, a spectrometer, a backing plate in the spectrometer, an electrode in the spectrometer in substantially aligned relationship with the backing plate, means for introducing molecules of the gas into the spectrometer for ionization and for retention of the ions in a relatively confined region, a detector in the spectrometer, a circuit for producing an electrical field between the backing plate and the electrode for the withdrawal of the ions in a pulse and for the movement of the ions towards the detector, a gate circuit, means for introducing the signals produced by the detector to the gate circuit, electrical circuits for opening the gate circuit at the time that the ions are expected to produce signals in the detector, and means for producing an indication of the signals passing through the gate circuit to indicate leaks.

2. A detector for locating leaks in a vessel, including, a probe, means for providing for the passage of molecules of a gas between the vessel and the probe upon the occurrence of a leak in the vessel, a mass spectrometer, means for passing molecules of the gas into the spectrometer upon the occurrence of a leak, means for producing ions from the gas molecules introduced into the spectrometer and for storing the ions within a relatively confined region, a detector in the spectrometer, means for producing a movement of the ions towards the detector from their place of retention, a gate circuit connected to the detector to receive the signals produced by the detector, a stage for producing a signal to open the gate circuit at the instant that the ions formed from the gas are expected to produce signals at the detector, and an indicator connected to the gate circuit to indicate the signals passing through the gate circuit.

3. A detector for locating leaks in a vessel, including, a probe, means for providing for the passage of molecules of a gas between the vessel and the probe upon the occurrence of a leak in the vessel, a spectrometer, means in the spectrometer for producing an electron stream, a backing plate in the spectrometer disposed on one side of the stream, an electrode in the spectrometer disposed in substantially aligned relationship with the backing plate and one the other side of the stream, means for introducing molecules of the gas into the electron stream for ionization and for retention of the ions in the stream, a detector in the spectrometer, a circuit for imposing pulses of voltage on the backing plate relative to the voltage on the electrode for the withdrawal of the ions in a pulse and for the movement of the ions towards the detector, a gate circuit, means for introducing to the gate circuit the signals produced by the detector, a first monostable stage triggered by the pulse circuit to produce a pulse for substantially the period of time required for the ions to travel from their place of retention to a position for detection by the detector, a second monostable stage connected to the first monostable stage to produce a pulse at substantially the instant that the ions of the gas are expected to produce signals at the detector, the second monostable stage being connected to the gate circuit to open the gate circuit for the passage of signals from the detector upon being triggered, and means for producing an indication of the signals passing through the gate circuit to indicate leaks.

References Cited in the file of this patent

UNITED STATES PATENTS

| | | |
|---|---|---|
| 2,582,216 | Koppius | Jan. 15, 1952 |
| 2,612,607 | Stephens | Sept. 30, 1952 |

OTHER REFERENCES

"Mass spectrometers for leak detection," by Nier et al., published in Journal of Applied Physics, vol. 18, January 1947, pages 30–33.